US007826048B2

(12) United States Patent
Holecek et al.

(10) Patent No.: US 7,826,048 B2
(45) Date of Patent: Nov. 2, 2010

(54) APPARATUS FOR MEASURING DOCTOR BLADE GEOMETRIC DEVIATIONS

(75) Inventors: Thomas Allen Holecek, Lexington, KY (US); Robert L. Paterson, Nicholasville, KY (US)

(73) Assignee: Lexmark International, Inc., Lexington, KY (US)

( * ) Notice: Subject to any disclaimer, the term of this patent is extended or adjusted under 35 U.S.C. 154(b) by 978 days.

(21) Appl. No.: 11/616,956

(22) Filed: Dec. 28, 2006

(65) Prior Publication Data

US 2008/0159618 A1 Jul. 3, 2008

(51) Int. Cl.
*G01N 21/00* (2006.01)

(52) U.S. Cl. .................................... 356/237.2; 356/634

(58) Field of Classification Search ....................... None
See application file for complete search history.

(56) References Cited

U.S. PATENT DOCUMENTS

| | | | | |
|---|---|---|---|---|
| 5,570,186 | A | 10/1996 | Satzger et al. | |
| 5,654,799 | A * | 8/1997 | Chase et al. | 356/600 |
| 5,786,042 | A | 7/1998 | Inoue et al. | |
| 6,504,957 | B2 | 1/2003 | Nguyen et al. | |
| 6,830,659 | B2 | 12/2004 | Sovijarvi | |
| 2003/0110610 | A1 | 6/2003 | Duquette et al. | |
| 2004/0123965 | A1 | 7/2004 | Isometsa et al. | |
| 2005/0072135 | A1 | 4/2005 | Kormann | |
| 2007/0085904 | A1 | 4/2007 | Heyworth | |
| 2008/0162073 | A1 | 7/2008 | Holecek et al. | |

* cited by examiner

*Primary Examiner*—Gregory J Toatley, Jr.
*Assistant Examiner*—Juan D Valentin

(57) ABSTRACT

An apparatus for measuring geometric deviations in a doctor blade includes a camera defining an optical axis. The optical axis defines an X-axis in a Cartesian coordinate system. An origin of the Cartesian coordinate system defines an intersection point. A first light source has a first central axis. The first central axis is angularly disposed from the X-axis by a first angle with respect to the X-axis. A second light source has a second central axis. The second central axis is angularly disposed from the X-axis by a second angle with respect to the X-axis. A doctor blade holding device is configured to mount a doctor blade wherein a portion of the doctor blade to be measured is positioned at the intersection point.

27 Claims, 13 Drawing Sheets

APPARATUS FOR MEASURING DOCTOR BLADE GEOMETRIC DEVIATIONS

BACKGROUND OF THE INVENTION

1. Field of the Invention

The present invention relates to a doctor blade, and, more particularly, to an apparatus for measuring doctor blade geometric deviations.

2. Description of the Related Art

Electrophotographic image forming devices, such as laser printers, include a drum having a rigid cylindrical surface that is coated along a defined length of its outer surface with a photoconductive material. The surface of the photoconductive drum is charged to a uniform electrical potential and then selectively exposed to light in a pattern corresponding to an original image. Those areas of the surface of the photoconductive drum exposed to light are discharged thus forming a latent electrostatic image on the photoconductive surface. A developer material, such as toner, having an electrical charge such that the toner is attracted to the photoconductive surface is brought into contact with the photoconductive surface.

The toner is stored in a toner reservoir adjacent to the photoconductive drum. A doctor blade and a developer roller are positioned between the toner reservoir and the photoconductive drum for controlling the amount of toner that is transferred to the photoconductive drum. Referring to FIGS. 1A and 1B, a doctor blade 10 may be, for example an elongate member having a longitudinal extent 12, for example, in the Z-axis direction, such that the longitudinal extent 12 would extend across the width of the developer roller. Adjacent a longitudinal edge 14 of doctor blade 10 there is formed a curved radial surface 16 having a radius 18, such that doctor blade 10 resembles a J-shape when viewed down the Z-axis as in the side view of FIG. 1B. Ideally, curved radial surface 16 is designed to contact the developer roller along a line of contact to meter the amount of toner transferred to the photoconductive drum. The ideal radius 18 may vary depending upon the application, but in one example is 700 microns.

It is important that the doctor blade make uniform and consistent contact across the entire length of the developer roller. Failure of the doctor blade to make uniform and consistent contact across the entire length of the developer roller will result in uneven toner amounts being transferred to the photoconductive drum, thereby resulting in inconsistent and unacceptable print quality.

Accordingly, it is highly desired that the doctor blade geometry be maintained within strict limits relating to linear straightness along the longitudinal extent 12 at the anticipated line of contact, and relating to the consistency of the radius 18 of the curved radial surface 16 along longitudinal extent 12 of doctor blade 10.

What is needed in the art is an apparatus for measuring doctor blade geometric deviations.

SUMMARY OF THE INVENTION

The present invention relates to an apparatus for measuring doctor blade geometric deviations, such as for example, by making radius and straightness measurements of the doctor blade.

The terms "first", "second", etc. preceding an element name, e.g., first light source, second light source, etc., are used for identification purposes to distinguish between similar elements, and are not intended to necessarily imply order, nor are the terms "first", "second", etc., intended to preclude the inclusion of additional similar elements.

The invention, in one form thereof, is directed to an apparatus for measuring geometric deviations in a doctor blade. The apparatus includes a camera defining an optical axis. The optical axis defines an X-axis in a Cartesian coordinate system, wherein a Y-axis is oriented vertically and a Z-axis is oriented orthogonal to both the X-axis and the Y-axis, and wherein an origin of the Cartesian coordinate system defines an intersection point. The camera is separated by a distance from the intersection point along the X-axis. A first light source is positioned to direct a first light beam toward the intersection point with the first light source being separated by a distance from the intersection point along a first central axis. The first central axis is angularly disposed from the X-axis by a first angle with respect to the X-axis. A second light source is positioned to direct a second light beam toward the intersection point with the second light source being separated by a distance from the intersection point along a second central axis. The second central axis is angularly disposed from the X-axis by a second angle with respect to the X-axis. A doctor blade holding device is configured to mount a doctor blade such that a longitudinal extent of the doctor blade is parallel to the Z-axis, and wherein a portion of the doctor blade to be measured is positioned at the intersection point.

The invention, in another form thereof, is directed to an apparatus for measuring geometric deviations in a doctor blade. The apparatus includes a camera defining an optical axis. The optical axis defines an X-axis in a Cartesian coordinate system, wherein a Y-axis is oriented vertically and a Z-axis is oriented orthogonal to both the X-axis and the Y-axis, and wherein an origin of the Cartesian coordinate system defines an intersection point. The camera is separated by a distance from the intersection point along the X-axis. A first light source has a first central axis. The first light source is separated by a distance from the intersection point along the first central axis. The first central axis is angularly disposed from the X-axis by a first angle that is positive with respect to the X-axis. A second light source has a second central axis. The second light source is separated by a distance from the intersection point along the second central axis. The second central axis is angularly disposed from the X-axis by a second angle, wherein the second angle is negative with respect to the X-axis. A third light source has a third central axis. The third light source is separated by a distance from the intersection point along the third central axis. The third central axis is coincident with the X-axis. A doctor blade holding device is configured to mount a doctor blade such that a longitudinal extent of the doctor blade is parallel to the Z-axis, and wherein a portion of the doctor blade to be measured is positioned at the intersection point.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1A:
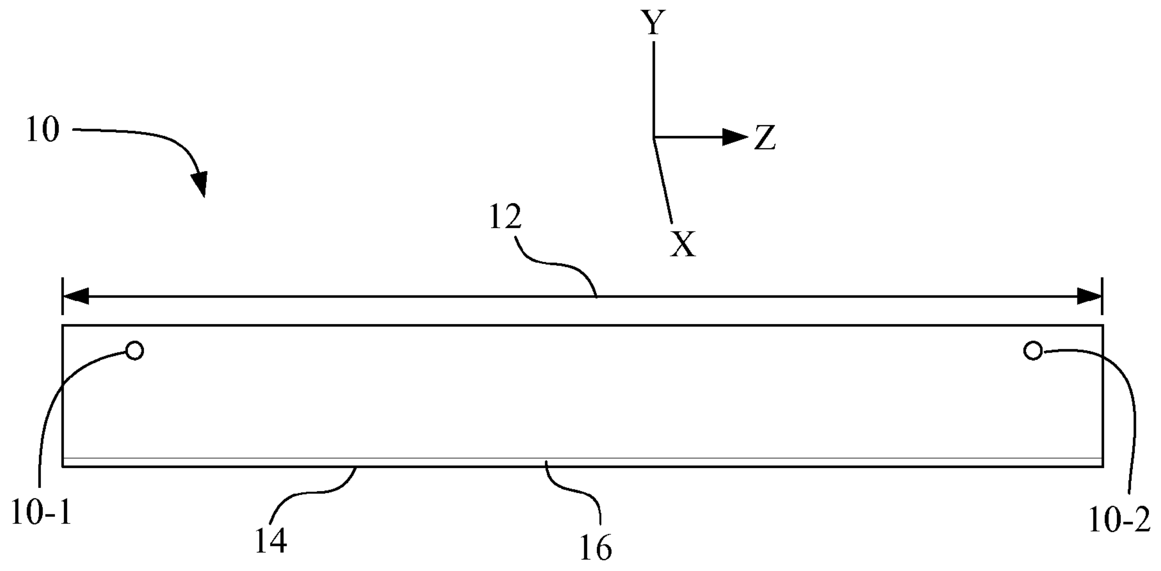
Fig. 1A (PRIOR ART)
FIG. 1A is a front view of a doctor blade.
Figure 1B:
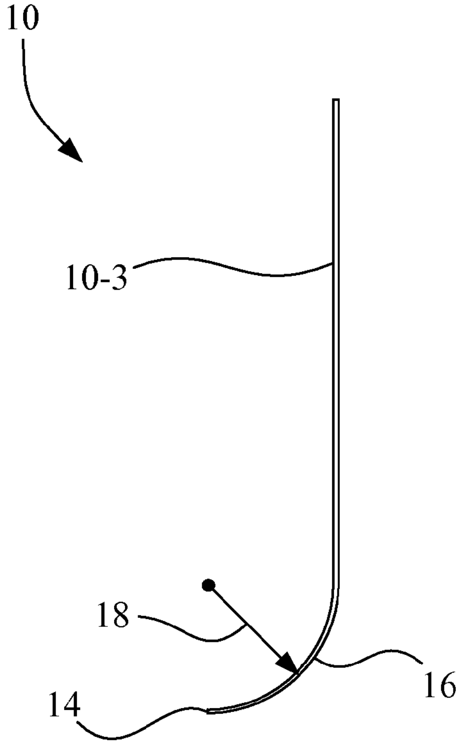
Fig. 1B (PRIOR ART)
FIG. 1B is a side view of the doctor blade of FIG. 1A.
Figure 2:
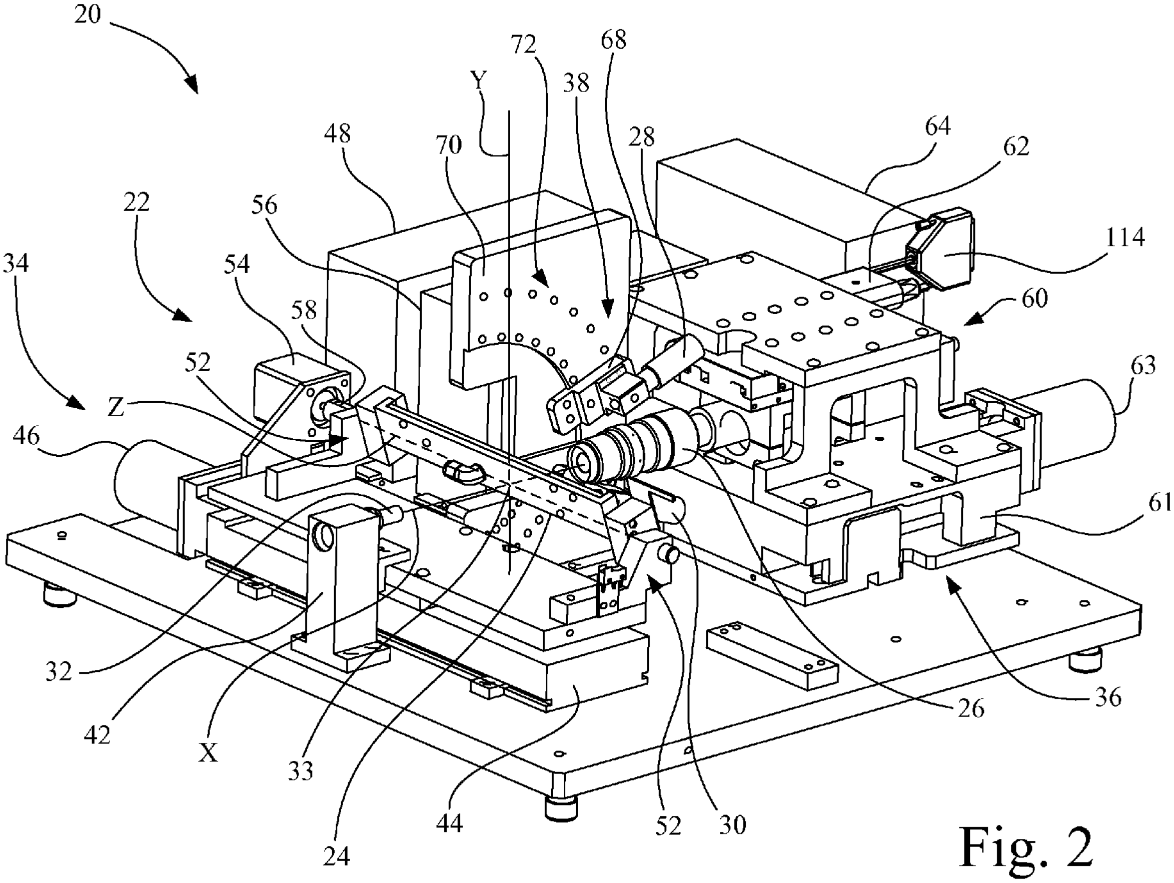
FIG. 2 is a perspective view of an apparatus for measuring geometric deviations in a doctor blade.
Figure 3:
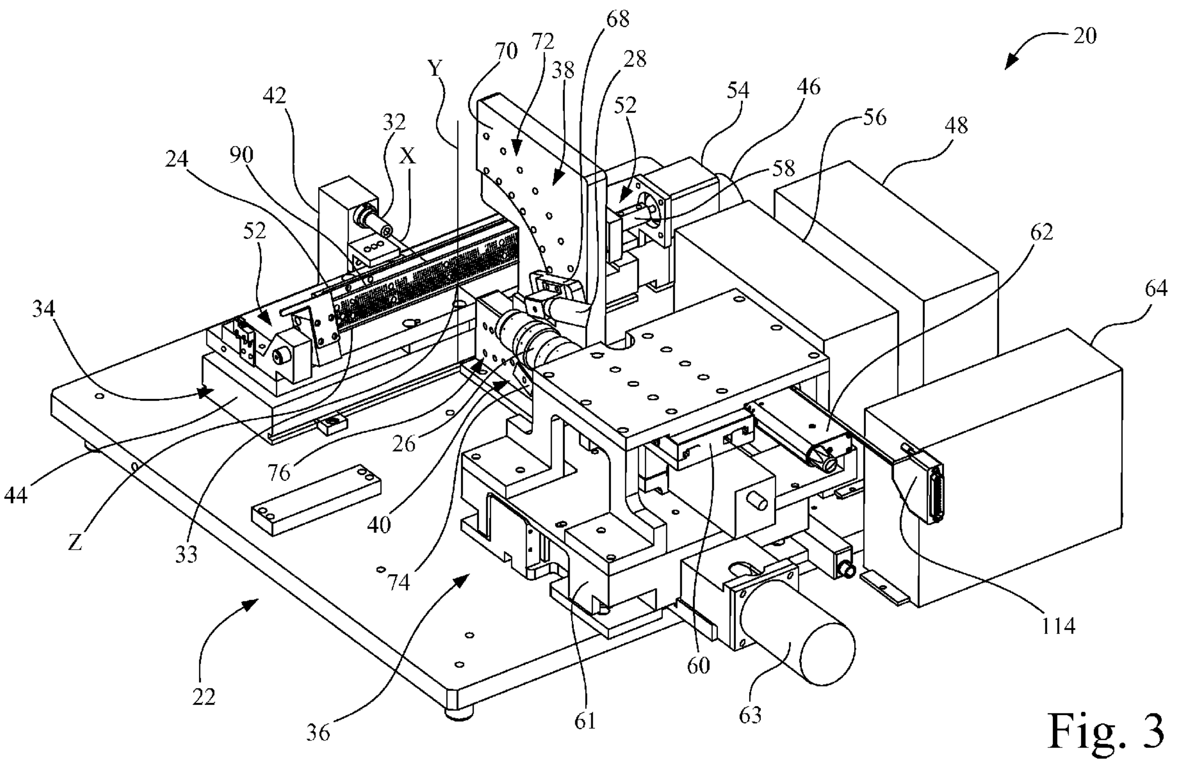
FIG. 3 is another perspective view of the apparatus for measuring geometric deviations in a doctor blade.

Referring now to the drawings and particularly to FIGS. 2-5, there is shown an apparatus 20 for measuring geometric deviations in a doctor blade, such as doctor blade 10 shown in FIGS. 1A and 1B. Apparatus 20 includes a mounting fixture 22, a doctor blade holding device 24, a camera 26, a first light source 28, a second light source 30, and a third light source 32.

Camera 26 may be, for example, a charge-coupled device (CCD) having a field of view of approximately one millimeter. Camera 26 defines an optical axis, which in turn defines an X-axis in a Cartesian coordinate system that will be used in describing the orientation of components of apparatus 20. A Y-axis is oriented vertically orthogonal to the X-axis. A Z-axis is oriented orthogonal to both the X-axis and the Y-axis. An origin 33 of the Cartesian coordinate system defines an intersection point, which may also be referenced by element number 33.

Mounting fixture 22 includes a mount 34 for mounting doctor blade holding device 24, a mount 36 for mounting camera 26, an angular mount 38 for mounting first light source 28, an angular mount 40 for mounting second light source 30, and a mount 42 for mounting third light source 32. Mounting fixture 22 is configured to move doctor blade holding device 24, and in turn to move doctor blade 10, along the Z-axis while mounting fixture 22 holds camera 26, first light source 28, and second light source 30 in a selected stationary position. Third light source 32 may be mounted in a fixed position.

Mount 34 is configured to provide linear movement of doctor blade holding device 24 along the Z-axis, and rotational movement of doctor blade holding device 24 around the Z-axis. Doctor blade holding device 24 is configured to mount a doctor blade, such as doctor blade 10. Mount 34 positions doctor blade holding device 24 such that a longitudinal extent 12 of doctor blade 10 is parallel to the Z-axis, and wherein a portion of doctor blade 10 to be measured is positioned at intersection point 33.

Mount 34 includes a slide mount 44, a motor 46, and a motor controller 48 to facilitate automated linear movement of doctor blade holding device 24 along the Z-axis. Motor 46 may be, for example, a stepper motor, and may be rotatably coupled to slide mount 44 by a lead screw arrangement 50 (see FIG. 5) of a type well known in the art to translate rotary motion into linear motion along the Z-axis. Motor 46 is electrically coupled to motor controller 48.

Mount 34 further includes a pivot 52, a motor 54, and a motor controller 56 to facilitate automated pivoting movement of doctor blade holding device 24 around the Z-axis. Motor 54 may be, for example, a stepper motor, and may be directly coupled by a coupler 58 to pivot 52. Motor 54 is electrically coupled to motor controller 56.

Mount 36 is configured to provide linear movement of camera 26 along the X-axis, and to provide linear movement of camera 26 along the Y-axis. Camera 26 is separated by a selectable distance D (see FIG. 6) from intersection point 33 along the X-axis. Mount 36 includes a movable slide mount 60, a motor 62, and a motor controller 64 to facilitate automated movement of camera 26 along the X-axis. Mount 36 may further include a movable vertical mount 61 and a motor 63 to facilitate automated movement of camera 26 to provide elevation adjustment of the optical axis (X-axis) up or down in the plane of the Y-axis. Alternatively, Y-axis elevation adjustment of the optical axis (X-axis) up or down in the plane of the Y-axis may be accomplished using shims (not shown).

Motor 62 may be, for example, a stepper motor, and may be rotatably coupled to slide mount 60 by a lead screw arrangement 66 (see FIG. 5) of a type well known in the art to translate rotary motion into linear motion along the X-axis. Motor 62 is electrically coupled to motor controller 64. Slide mount 60 provides adjustable linear positioning of camera 26 along the X-axis to adjust a focus of camera 26 relative to doctor blade 10, e.g., establishing a focal point at intersection point 33.

Motor 63 may be, for example, a stepper motor, and may be rotatably coupled to vertical mount 61 by a lead screw arrangement 67 (see FIG. 5) of a type well known in the art to translate rotary motion into linear motion along the Y-axis. Motor 63 is electrically coupled to motor controller 64, which serves as the motor controller for both of motors 62 and 63. Vertical mount 61 provides adjustable linear positioning of camera 26 along the Y-axis to adjust an elevation of camera 26 relative to doctor blade 10. Vertical mount 61 may be, for example, in the form of a scissor jack arrangement. As an alternative, elevation adjustment may be accomplished for example by a cam/cam follower arrangement.

Figure 6:
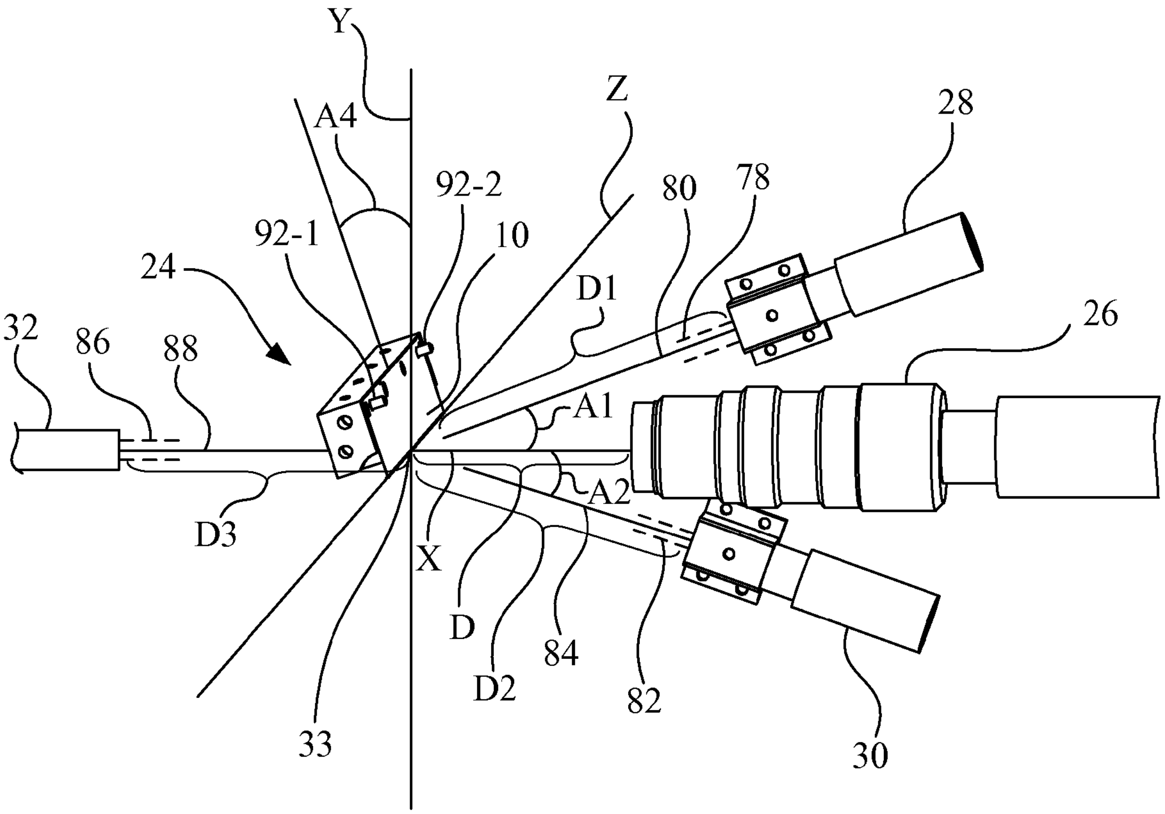
FIG. 6 is a diagrammatic illustration of an orientation of the camera and the multiple light sources of the apparatus of FIGS. 2-4 during a doctor blade radius measurement.

Referring also to FIG. 6, angular mount 38 is configured to provide rotational movement of first light source 28 around the Z-axis. Angular mount 38 includes a pivot 68 and a mounting plate 70. Mounting plate 70 includes a plurality of holes 72 arranged in a pattern formed by two concentric arcs relative to the Z-axis. First light source 28 is attached to pivot 68. Pivot 68 is attach by fasteners, such as bolts, in a set of the plurality of holes 72 to position first light source 28 at the desired angle A1 with respect to the X-axis (see FIG. 6). Thus, angular mount 38 provides adjustable angular positioning of first light source 28 relative to the X-axis.

Angular mount 40 is configured to provide rotational movement of second light source 30 around the Z-axis. Angular mount 40 includes a pivot 74 and mounting plate 70, which is shared with angular mount 38. Mounting plate 70 further includes a plurality of holes 76 arranged in a pattern formed by two concentric arcs relative to the Z-axis. Second light source 30 is attached to pivot 74. Pivot 74 is attached by fasteners, such as bolts, in a set of the plurality of holes 76 to position second light source 30 at the desired angle A2 with respect to the X-axis (see FIG. 6). Thus, angular mount 40 provides adjustable angular positioning of second light source 30 relative to the X-axis.

Mount 42 is configured as a fixed mount to position third light source 32 in parallel alignment with the X-axis, while permitting manual elevation adjustment of third light source 32 up or down in the plane of the Y-axis using shims (not shown).

Each of light sources 28, 30 and 32 are configured to produce a respective collimated light beam. Each of light sources 28, 30 and 32 may include, for example, a light emitting diode (LED), an incandescent lamp, an arc lamp, or a laser. Each of light sources 28, 30 and 32 may further include any associated lenses for collimating the generated light, in a manner known in the art. Each of light sources 28, 30 and 32 may further include a respective light intensity control, which may manually or automatically control the intensity of the respective light beam.

Referring to FIG. 6, first light source 28 generates a first collimated light beam 78 having a first central axis 80. First central axis 80 of first collimated light beam 78 is positioned by angular mount 38 on the X-Y plane of the Cartesian coordinate system. First light source 28 is positioned by angular mount 38 to direct first collimated light beam 78 toward the intersection point 33. First light source 28 is separated by a distance D1 from intersection point 33 along first central axis 80. First central axis 80 is angularly disposed from the X-axis by angle A1 that is positive with respect to the X-axis. A position of first light source 28 may be selected, for example, such that angle A1 is 90 degrees or less. In the component positions shown, angle A1 is about 20 degrees.

Second light source 30 generates a second collimated light beam 82 having a second central axis 84. Second central axis 84 of second collimated light beam 82 is positioned by angular mount 40 on the X-Y plane of Cartesian coordinate system. Second light source 30 is positioned by angular mount 40 to direct second collimated light beam 82 toward the intersection point 33. Second light source 30 is separated by a distance D2 from intersection point 33 along second central axis 84. Second central axis 84 is angularly disposed from the X-axis by angle A2 that is negative with respect to the X-axis. A position of second light source 30 may be selected, for example, such that an absolute value of second angle A2 is 90 degrees or less. In the component positions shown, angle A2 is about −20 degrees.

In one embodiment, for example, the position of first light source 28 and the position of second light source 30 are selected such that first angle A1 and second angle A2 are symmetrical with respect to X-axis, e.g., 20 degrees and −20 degrees, respectively.

Third light source 32 generates a third collimated light beam 86 having a third central axis 88. Third light source 32 is positioned by mount 42 to direct third collimated light beam 86 toward the intersection point 33 and toward camera 26. Third light source 32 is separated by a distance D3 from intersection point 33 along third central axis 88. In the present embodiment, third central axis 88 is coincident with the X-axis.

Figure 7:
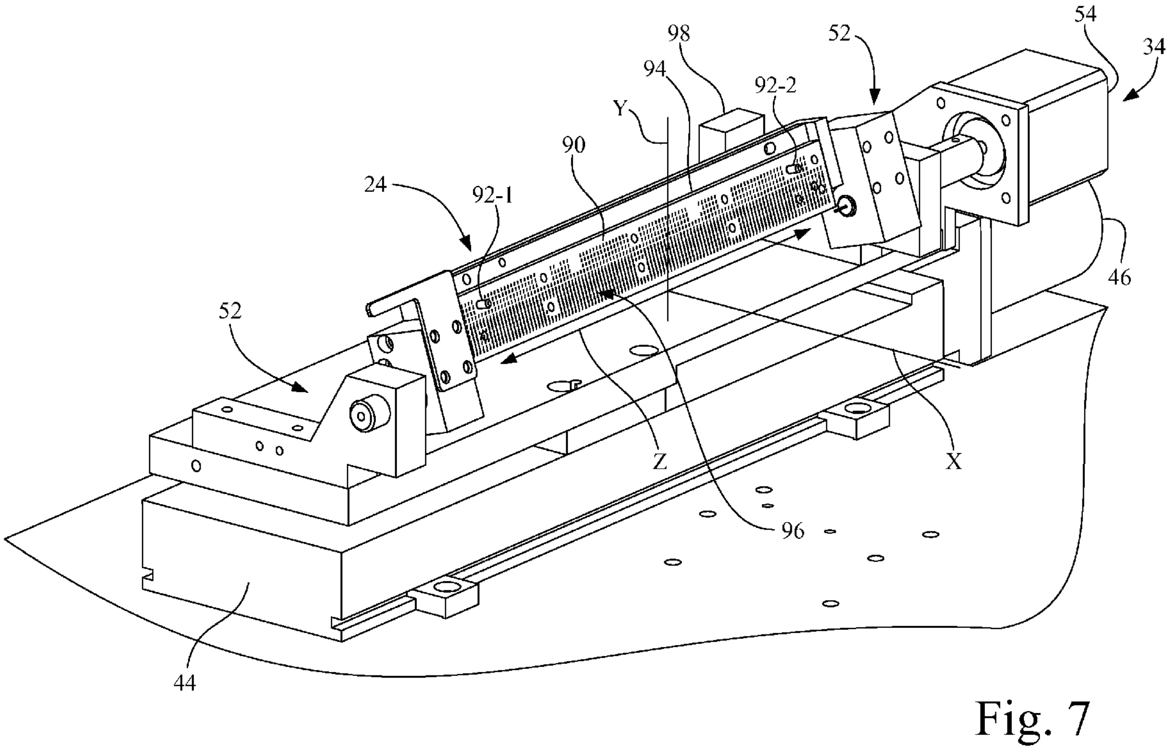
FIG. 7 is a perspective view of a portion of the apparatus of FIGS. 2-4 showing an embodiment of the doctor blade holding device of the apparatus of FIGS. 2-4 that uses vacuum to hold the doctor blade.

Referring also to FIG. 7, doctor blade holding device 24 may include a planar surface 90, serving as an anvil, from which doctor blade positioning pins 92-1, 92-2 extend to engage corresponding holes 10-1, 10-2 in doctor blade 10. In the present embodiment, doctor blade holding device 24 includes a vacuum holding mechanism 94 for holding doctor blade 10 stationary relative to doctor blade holding device 24 against planar surface (anvil) 90 using negative pressure applied to a flat surface 10-3 of doctor blade 10 (see FIG. 1B). As shown in FIG. 7, vacuum holding mechanism 94 is formed by a plurality of passageways 96 that terminate as holes at planar surface 90. The plurality of passageways 96 fluidically connects a vacuum source 98 to the planar surface 90 of doctor blade holding device 24.

Figure 8:
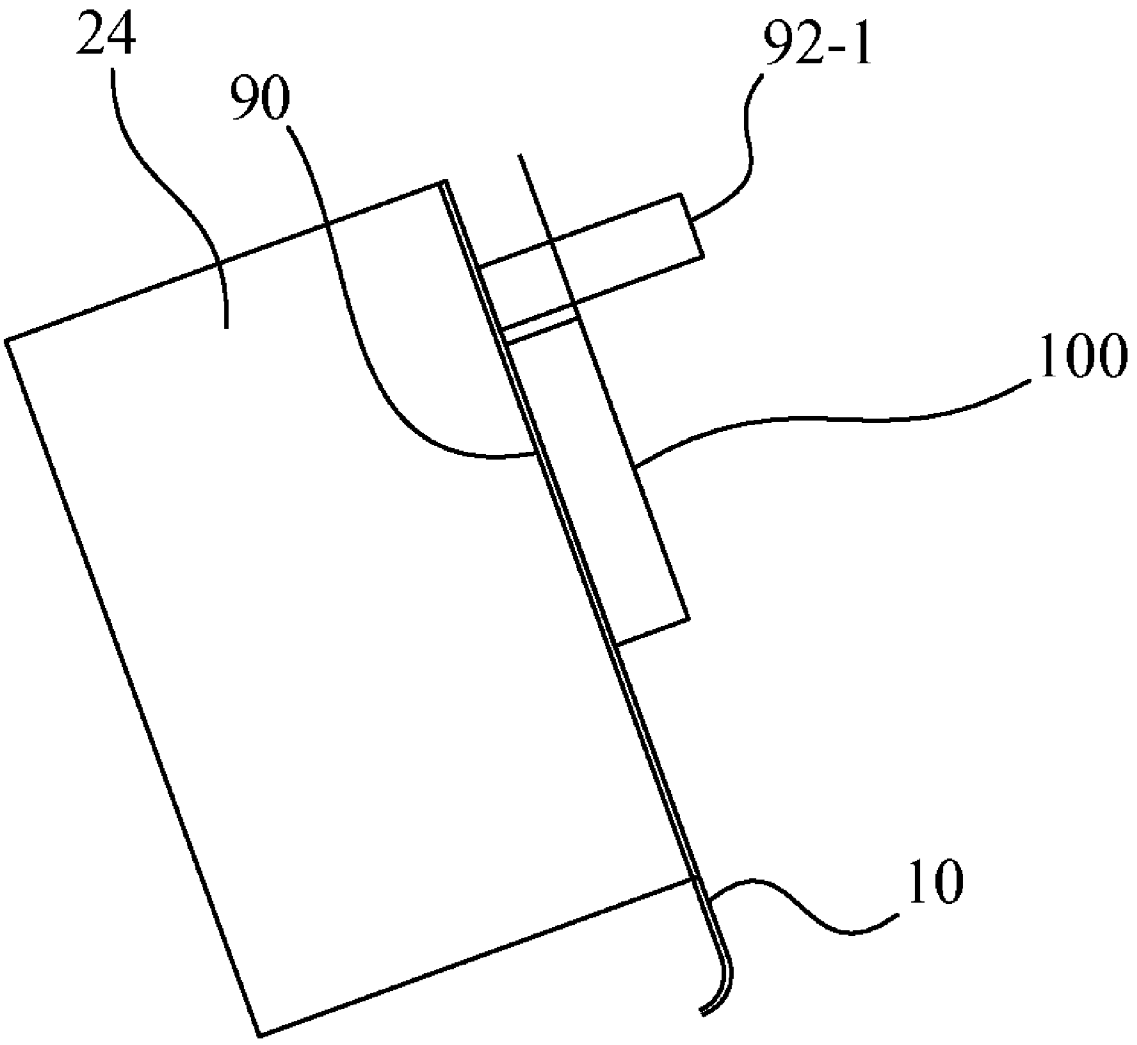
FIG. 8 is a side view of a doctor blade holding device that includes a magnetic holding mechanism for holding doctor blade to the anvil.

Alternatively, as shown in FIG. 8, doctor blade holding device 24 may include a magnetic holding mechanism 100 for holding doctor blade 10 stationary relative to doctor blade holding device 24 against planar surface 90 using magnetic force.

Figure 9:
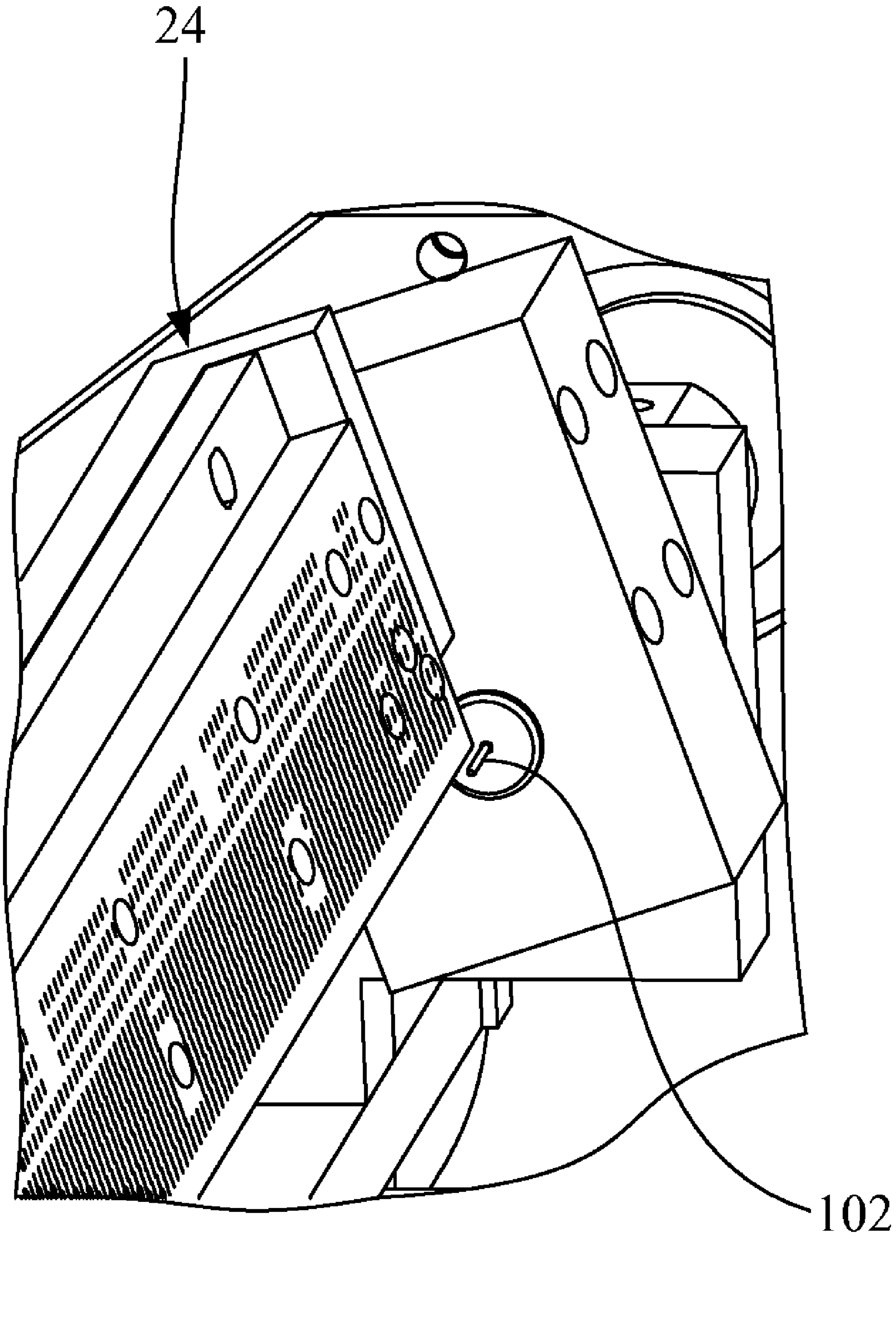
FIG. 9 is a sub-portion of the doctor blade holding device of FIG. 7 showing a Z-axis calibration pin.
Figure 10:
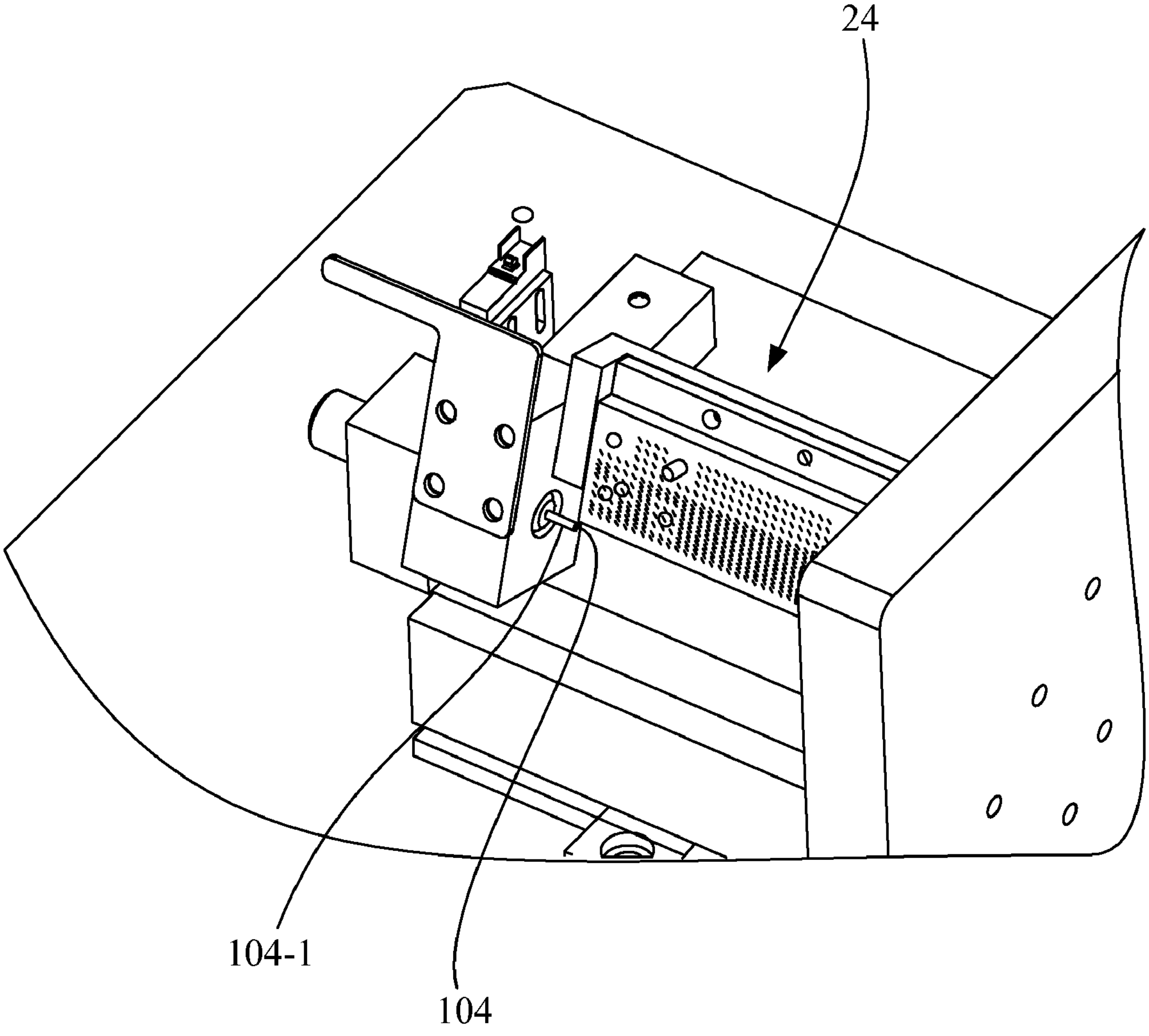
FIG. 10 is a sub-portion of the doctor blade holding device of FIG. 7 showing a radius calibration pin.
Figure 11:
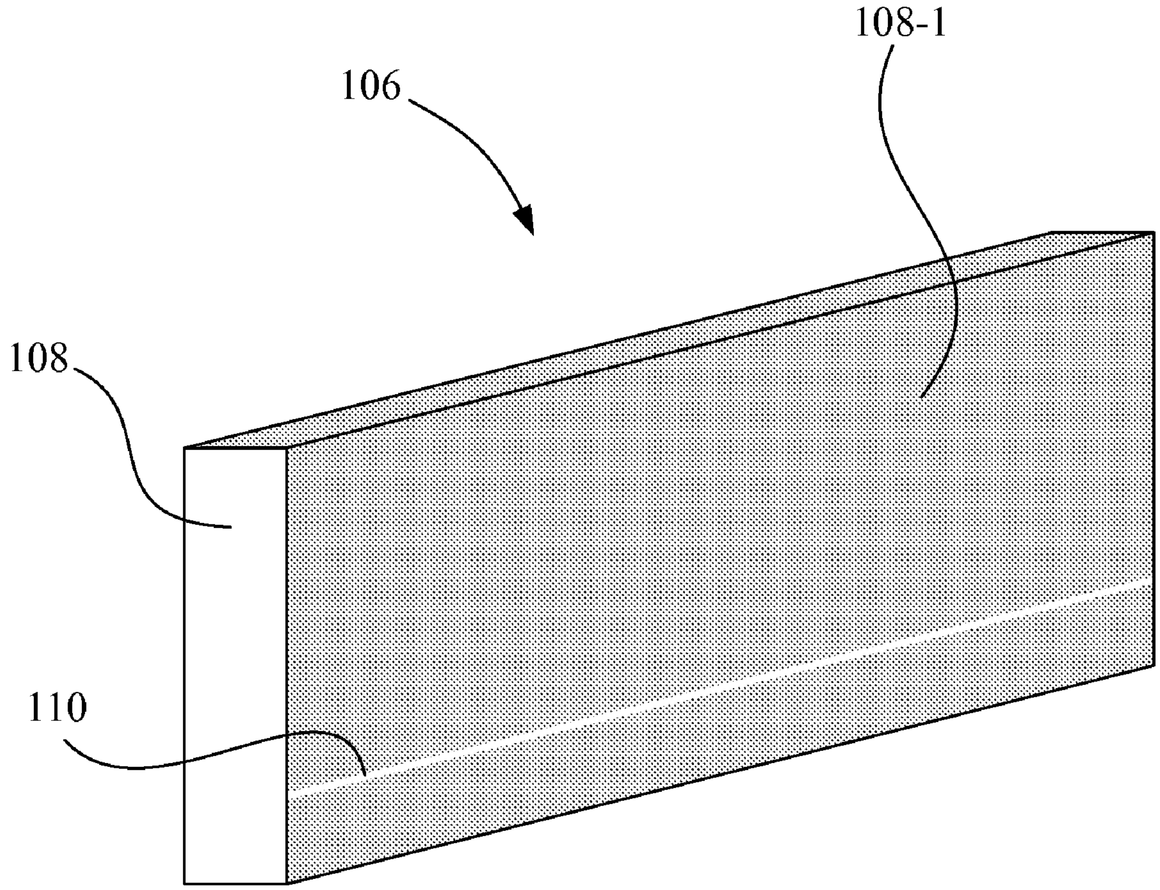
FIG. 11 is an embodiment of a straightness calibration device for use with the apparatus of FIGS. 2-4.

As shown in FIGS. 9-11, in order to facilitate calibration of apparatus 20, there is included a Z-axis (calibration) pin 102, a radius calibration pin 104, and a straightness calibration device 106.

Referring to FIG. 9, Z-axis (calibration) pin 102 is mounted to doctor blade holding device 24. Z-axis pin 102 has a known diameter, such as for example, 600 microns, and extends axially along the Z-axis. The use of Z-axis pin 102 in calibrating apparatus 20 will be described in further detail below.

Referring to FIG. 10, radius calibration pin 104 is mounted to doctor blade holding device 24. Radius calibration pin 104 has a known radius, such as for example, 800 microns, and extends axially along the Z-axis. Radius calibration pin 104 is positioned to face Z-axis pin 102 across origin 33. The use of radius calibration pin 104 in calibrating apparatus 20 will be described in further detail below.

Referring to FIG. 11, there is shown an exemplary straightness calibration device 106. Straightness calibration device 106 is configured for mounting in doctor blade holding device 24 in the normal position of doctor blade 10. Straightness calibration device 106 may be formed, for example, from a transparent, e.g., glass, plate 108 having an opaque coating 108-1 on one side. The opaque coating 108-1 is photo etched to remove a thin line of the opaque coating to form a straight calibration line 110. The line width (vertically) of straight calibration line 110 may be, for example, 100 microns.

Referring again to FIG. 5, there is shown a schematic illustration of apparatus 20 communicatively coupled to a computer 112 via a communications link 114, such as for example, a multi-conductor cable. Alternatively, it is contemplated that communications link 114 may be formed as a wireless connection. In particular, each of camera 26, first light source 28, second light source 30, third light source 32, motor controller 48, motor controller 56, and motor controller 64 is individual communicatively coupled to computer 112 by communications link 114.

Computer 112 may be, for example, a personal computer having a monitor screen 112-1, and further including a processor, memory, and input devices, as is typical in the art. Stored in memory are one or more computer application programs which when executed operates camera 26 and one or more of motor controllers 48, 56, and 64 and one or more of light sources 28, 30, and 32 for calibrating apparatus 20 prior to making measurements of doctor blade 10. Also, stored in memory is a computer application program which when executed operates camera 26 and one or more of motor controllers 48, 56, and 64 and one or more light sources 28, 30, and 32 for measuring geometric deviations in a doctor blade, such as doctor blade 10.

Figure 12:
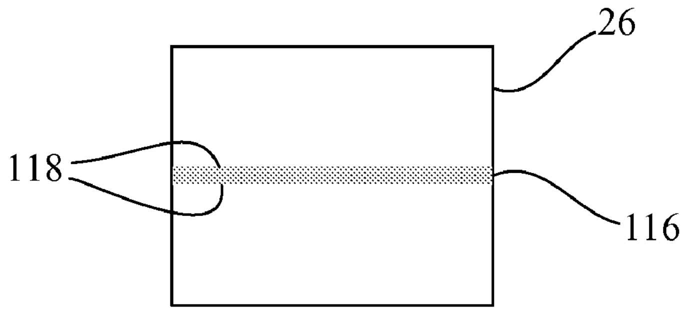
FIG. 12 is a pictorial illustration of the backlighting of the Z-axis pin of FIG. 9 as perceived by the camera in the apparatus of FIGS. 2-4.

For example, during execution of a vertical distance (Y-axis) calibration, computer 112 executes program instructions to operate motor controller 48, so as to move slide mount 44 that mounts doctor blade holding device 24 along the Z-axis until Z-axis pin 102 is moved to the origin 33. Computer 112 then turns on third light source 32 to produce third collimated light beam 86, thereby backlighting the Z-axis pin 102 to generate a shadow 116 that is perceived by camera 26, as illustrated in FIG. 12. Camera 26 senses the shadow 116 as two horizontally extending and vertically spaced dark lines 118 corresponding to the known diameter of Z-axis pin 102. Computer 112 then executes program instructions to convert a camera pixel distance between the vertically spaced dark lines to microns per pixel.

Figure 13:
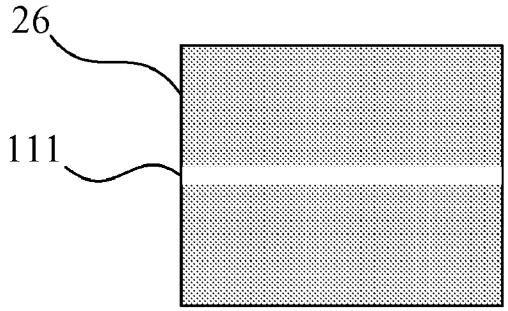
FIG. 13 is a pictorial illustration of the backlighting of the straightness calibration device of FIG. 11 as perceived by the camera in the apparatus of FIGS. 2-4.

Another example of a calibration program is a straightness calibration. The straightness calibration generates a correction for vertical (Y-axis) variations in the slide mount 44 that mounts doctor blade holding device 24 as slide mount 44 is moved along the Z-axis between its movement limits. Straightness calibration device 106 is mounted in doctor blade holding device 24. During execution of the straightness calibration, computer 112 turns on a backlight source, such as third light source 32 to produce third collimated light beam 86, thereby backlighting the straight calibration line 110 formed on straightness calibration device 106. Alternatively, a separate light source may be placed behind straightness calibration device 106. Camera 26 senses the light passing through straight calibration line 110 as a white line 111, as illustrated in FIG. 13, and more particularly senses one of the line edges, e.g., the upper edge, of white line 111 that represents straight calibration line 110.

Computer 112 then controls camera 26 for generating a straightness calibration signal corresponding to the line width (Y-axis variation) of straight calibration line 110 at origin 33, as computer 112 commands motor controller 48 to move slide mount 44 such that doctor blade holding device 24 is moved along the Z-axis. Computer 112 then uses the straightness calibration signal to map a straightness of doctor blade holding device 24 as doctor blade holding device is moved along the Z-axis. The map is then converted into compensation values that are used while measuring geometric deviations in a doctor blade 10 so as to compensate for straightness variations along the Z-axis inherent in apparatus 20, and more particularly, inherent in mount 34.

Figure 14:
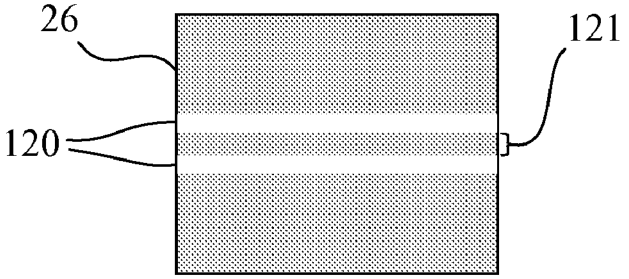
FIG. 14 is a pictorial illustration of the lighting of the radius calibration pin of FIG. 10 as perceived by the camera in the apparatus of FIGS. 2-4.

As another example, during a doctor blade radius calibration, computer 112 executes program instructions to operate motor controller 48, so as to move slide mount 44 that mounts doctor blade holding device 24 along the Z-axis until radius calibration pin 104 is moved to the origin 33. Computer 112 then controls first light source 28 and second light source 30 to generate first collimated light beam 78 and second collimated light beam 82, respectively. First collimated light beam 78 and second collimated light beam 82 are reflected off of an outer curved surface 104-1 of radius calibration pin 104 (see also FIG. 10). Camera 26 senses the reflection of first collimated light beam 78 and second collimated light beam 82 as two horizontally extending and vertically spaced light lines 120, as illustrated in FIG. 14, having a spacing 121 corresponding to the known radius of radius calibration pin 104. Computer 112 then executes program instructions to correlate a number of camera pixels between the two horizontally extending and vertically spaced light lines 120 to the known radius of radius calibration pin 104, with the units being, for example, in microns per camera pixel.

Measuring geometric deviations in a doctor blade, such as doctor blade 10, may include, for example, measuring the straightness of doctor blade 10, i.e., vertical (Y-axis) deviations along the Z-axis, and measuring the doctor blade radius 18 associated with curved radial surface 16 of doctor blade 10 at various points along the longitudinal extent 12 of doctor blade 10.

Figure 15A:
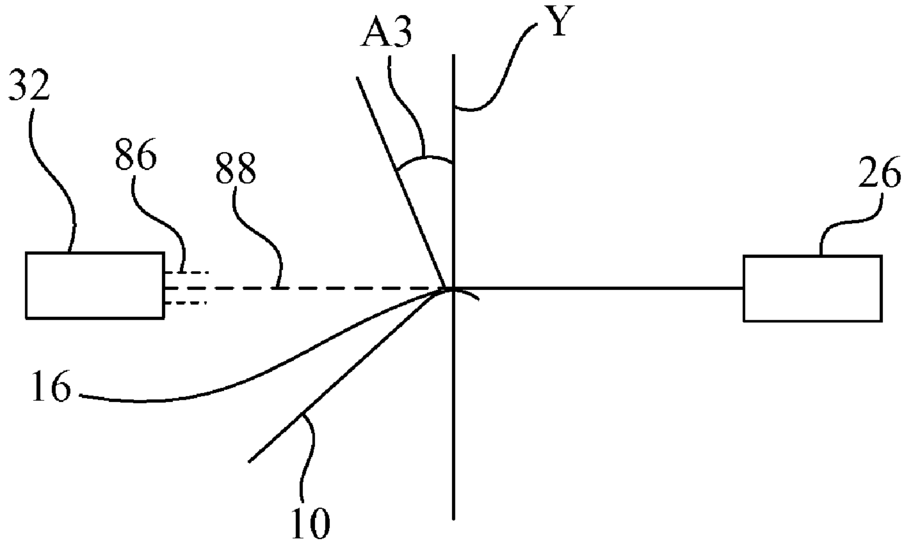
FIG. 15A is a diagrammatic illustration of an orientation of the camera and the backlighting light source of the apparatus of FIGS. 2-4 during a Z straightness measurement of a doctor blade.

During a doctor blade Z straightness measurement illustrated in FIG. 15A, doctor blade 10 is mounted in doctor blade holding device 24. In this example, a measurable length of doctor blade 10 is 216.7 mm. Computer 112 controls third light source 32 to generate third collimated light beam 86, which backlights doctor blade 10 mounted on doctor blade holding device 24. Computer 112 controls motor controller 56 such that motor 54 moves pivot 52 to position doctor blade 10 at an angle A3 offset from the Y-axis, and is positioned such that a tangent of curved radial surface 16 of doctor blade 10 lies on the X-axis, as illustrated in FIG. 15A, with light from third light source 32 being incident on curved radial surface 16. Angle A3 may be, for example, 20 degrees.

Figure 15B:
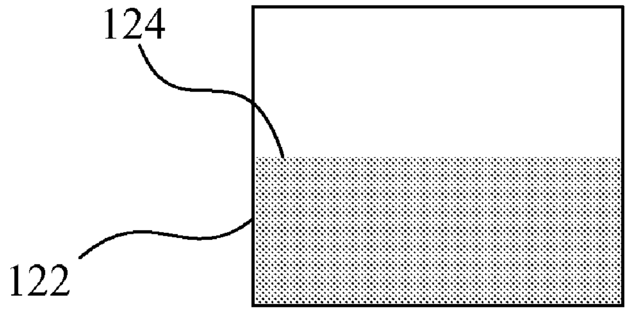
FIG. 15B is a pictorial illustration of the backlighting of the doctor blade as perceived by the camera in the apparatus of FIGS. 2-4 during the Z straightness measurement of the doctor blade of FIG. 15B.

As illustrated in FIG. 15B, camera 26 receives a shadow 122 having an upper horizontally extending shadow edge 124 that corresponds to an edge of doctor blade 10 along curved radial surface 16 at the X-axis tangent based on the light cast by third collimated light beam 86, and senses a vertical elevation of shadow edge 124 at origin 33. Camera 26 generates a straightness signal corresponding to a straightness of doctor blade 10, as computer 112 commands motor controller 48 to move slide mount 44 such that doctor blade holding device 24 and in turn as doctor blade 10 is moved along the Z-axis. The straightness signal constitutes a sampling of the radius of curved radial surface 16 of doctor blade 10. The sampling rate may, for example, correspond to a sampling at each millimeter along the longitudinal extent 12 of doctor blade 10, e.g., 216 times, with the desired sampling rate depending for example on the accuracy desired.

Camera 26 supplies the straightness signal to computer 112 for further processing to determine if the straightness of doctor blade 10 is within an acceptable tolerance. For example, computer 112 may process the straightness signal to take the slope out of the data. Assume that X is the value of the 216 places measured. Also assume that Y is the blade values in microns of the 216 points. Computer 112 then calculates the slope m and the intercept b. The slope is taken out using the equation:

$$ynew=Ydata-(m*Xdata+b).$$

The equation representing straightness is:

$$ST=\text{Maximum}\,ynew-\text{minimum}\,ynew.$$

A graph is then drawn on the monitor screen 112-1 of computer 112 of the data without the slope, with the X-axis in millimeters and the Y-axis in microns. The monitor screen 112-1 of computer 112 also displays the Z straightness number ST, and the data is stored in memory. If the Z straightness ST exceeds a predefined limit (e.g., +/−50 microns) then the doctor blade may be marked as “failed”.

Figure 4:
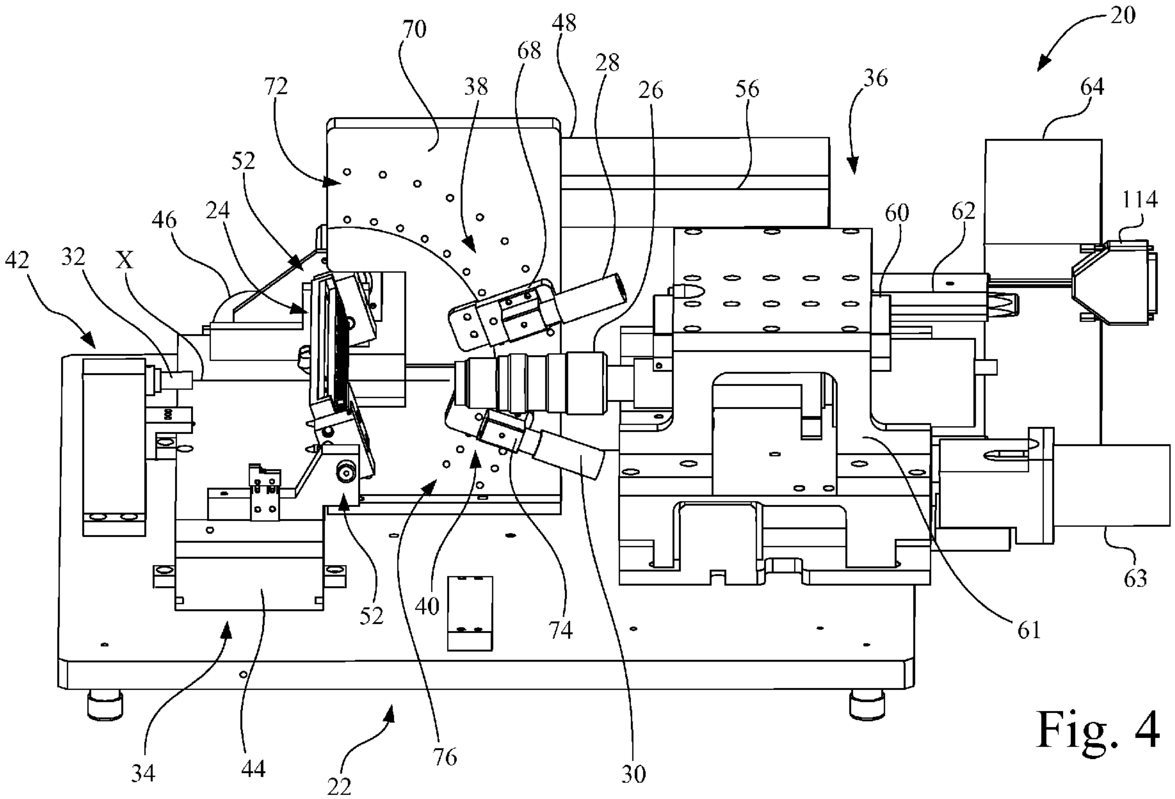
FIG. 4 is a side view of the apparatus of FIGS. 2 and 3.
Figure 5:
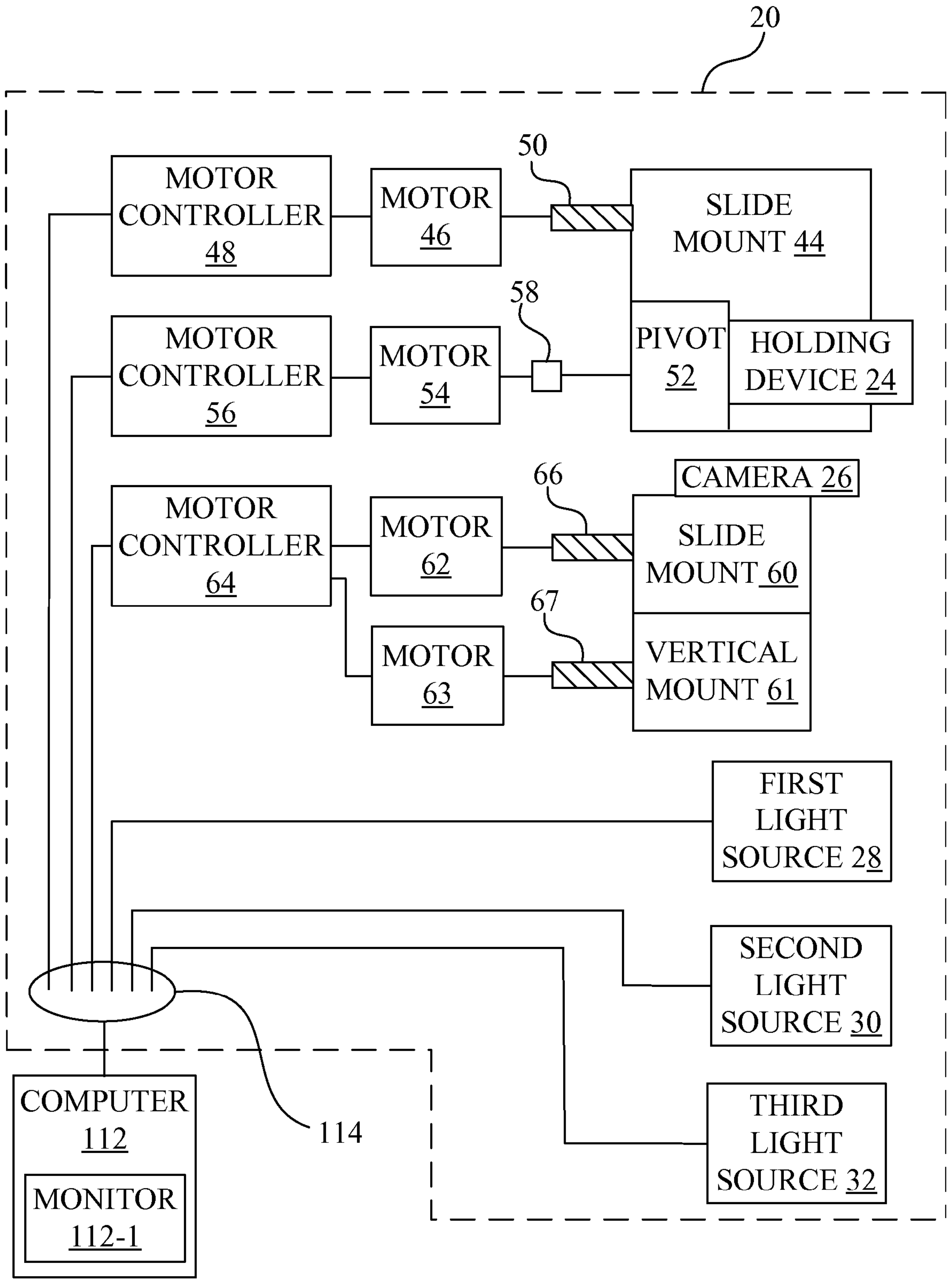
FIG. 5 is a schematic illustration of the apparatus of FIGS. 2-4 communicatively coupled to a computer.

During a doctor blade radius measurement, doctor blade 10 is mounted in doctor blade holding device 24. For doctor blade 10, the specification on the doctor blade radius 18 of curved radial surface 16 is 800+/−50 microns. As illustrated in FIGS. 4-6, computer 112 controls motor controller 56 such that motor 54 moves pivot 52 to position doctor blade 10 at an angle A4, e.g., 20 degrees offset from the Y-axis, such that a tangent of curved radial surface 16 of doctor blade 10 lies on the Y-axis. Computer 112 controls first light source 28 and second light source 30 to generate first collimated light beam 78 and second collimated light beam 82, respectively.

Camera 26 receives a reflection of first collimated light beam 78 and second collimated light beam 82 off of the curved radial surface 16 of doctor blade 10, and a reflection pattern is sensed by camera 26 resembling the pattern shown in FIG. 14. Camera 26 generates a radius signal corresponding to radius 18 of curved radial surface 16 of doctor blade 10, as computer 112 commands motor controller 48 to move slide mount 44 such that doctor blade holding device 24, and in turn doctor blade 10, is moved along the Z-axis. The radius signal constitutes a sampling of the radius of curved radial surface 16 of doctor blade 10. The sampling rate may, for example, correspond to a fixed number of locations (e.g., about every 15.48 mm over a measurable length of 216.7 mm) along the longitudinal extent 12 of doctor blade 10, with the desired sampling rate depending for example on the accuracy desired.

Camera 26 supplies the radius signal to computer 112 for further processing to determine if the radius of doctor blade 10 is within an acceptable tolerance. For example, the radius signal corresponding to the number of sampled points measured may be curve fit to a fifth order polynomial. The data representing the radius signal and curve fit of the data may then be displayed on the monitor screen 112-1 of computer 112. If the curve fit exceeds a predefined limit (e.g., +/−50 microns) then the doctor blade may be marked as "failed".

In addition to making the doctor blade radius measurement, the X straightness may be determined. X straightness is the middle distance between the two white lines (see, e.g., FIG. 14) at each of the sampling points, which is reported to computer 112 as a slope and straightness. Then the slope is taken out using the equation:

$$ym\text{new}=Ym\text{data}-(m*X\text{data}+b).$$

The equation represents X straightness is:

$$STx=\text{maximum}ym\text{new}-\text{minimum}ym\text{new}.$$

A graph of the data may be drawn on the monitor screen 112-1 of computer 112 without the slope, with the X-axis in millimeters and the Y-axis in microns. If the X straightness exceeds a predefined limit (e.g., +/−50 microns) then the doctor blade may be marked as "failed". Computer 112 may then store the X straightness data.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for measuring geometric deviations in a doctor blade, comprising:

a camera defining an optical axis, said optical axis defining an X-axis in a Cartesian coordinate system, wherein a Y-axis is oriented vertically and a Z-axis is oriented orthogonal to both said X-axis and said Y-axis, and wherein an origin of said Cartesian coordinate system defines an intersection point, with said camera being separated by a distance from said intersection point along said X-axis;

a first light source that generates a first light beam having a first central axis, said first light source being positioned to direct said first light beam toward said intersection point with said first light source being separated by a distance from said intersection point along said first central axis, said first central axis being angularly disposed from said X-axis by a first angle with respect to said X-axis;

a second light source that generates a second light beam having a second central axis, said second light source being positioned to direct said second light beam toward said intersection point with said second light source being separated by a distance from said intersection point along said second central axis, said second central axis being angularly disposed from said X-axis by a second angle with respect to said X-axis; and a doctor blade holding device to mount a doctor blade such that a longitudinal extent of said doctor blade is parallel to said Z-axis, and wherein a portion of said doctor blade is positioned at said intersection point during a measurement of said doctor blade.

2. The apparatus of claim 1, wherein said first central axis of said first light beam and said second central axis of said second light beam are positioned on the X-Y plane of said Cartesian coordinate system.

3. The apparatus of claim 1, comprising a mounting fixture for mounting said camera, said first light source, and second light source, and said doctor blade holding device.

4. The apparatus of claim 3, wherein said mounting fixture includes a first angular mount for mounting said first light source and a second angular mount for mounting said second light source, said first angular mount providing adjustable angular positioning of said first light source relative to said X-axis, and said second angular mount providing adjustable angular positioning of said second light source relative to said X-axis.

5. The apparatus of claim 4, wherein a position of said first light source is selected such that said first angle is 90 degrees or less, and a position of said second light source is selected such that an absolute value of said second angle is 90 degrees or less.

6. The apparatus of claim 4, wherein a position of said first light source and a position of said second light source are selected such that said first angle and said second angle are symmetrical with respect to said X-axis.

7. The apparatus of claim 3, wherein said mounting fixture includes a slide mount for mounting said camera, said slide mount providing adjustable linear positioning of said camera along said X-axis to adjust a focus of said camera relative to said doctor blade.

8. The apparatus of claim 3, wherein said mounting fixture is configured to move said doctor blade along said Z-axis while said camera, said first light source and said second light source are stationary.

9. The apparatus of claim 1, wherein said doctor blade holding device includes a vacuum holding mechanism for holding said doctor blade relative to a planar surface of said doctor blade holding device using negative pressure applied to a flat surface of said doctor blade.

10. The apparatus of claim 1, wherein said doctor blade holding device includes a magnetic holding mechanism for holding said doctor blade stationary relative to said doctor blade holding device using magnetic force.

11. The apparatus of claim 1, further comprising a third light source that generates a third light beam having a third central axis, said third light source being positioned to direct said third light beam toward said intersection point and toward said camera, with said third light source being separated by a distance from said intersection point along said third central axis, said third central axis being coincident with said X-axis.

12. The apparatus of claim 11, further comprising a computer communicatively coupled to each of said camera, said first light source, said second light source and said third light source.

13. The apparatus of claim 12, further comprising a Z-axis pin mounted to said doctor blade holding device, said Z-axis pin having a known diameter and extending axially along said Z-axis.

14. The apparatus of claim 13, wherein during a vertical distance calibration, said Z-axis pin is moved to said origin, said third light beam backlighting said Z-axis pin to generate a shadow perceived by said camera, said camera seeing said shadow as two horizontally extending and vertically spaced dark lines corresponding to said known diameter of Z-axis pin, said computer converting a camera pixel distance between said vertically spaced dark lines to microns per pixel.

15. The apparatus of claim 12, further comprising a straightness calibration device for mounting in said doctor blade holding device, said straightness calibration device being formed from a transparent plate having an opaque coating that is etched to form a straight calibration line, wherein during a straightness calibration, said third light beam backlights said straight calibration line, said camera generating a straightness calibration signal corresponding to an elevation of said straight calibration line at said origin as said doctor blade holding device is moved along said Z-axis.

16. The apparatus of claim 15, wherein said computer uses said straightness calibration signal to map a straightness of said doctor blade holding device as said doctor blade holding device is moved along said Z-axis.

17. The apparatus of claim 12, further comprising a radius calibration pin mounted to said doctor blade holding device, said radius calibration pin having a known radius and extending axially along said Z-axis.

18. The apparatus of claim 17, wherein during a radius calibration, said radius calibration pin is moved to said origin, said first light beam and said second light being reflected off of an outer curved radial surface of said radius calibration pin, said camera seeing the reflection of said first light beam and said second light as two horizontally extending and vertically spaced light lines corresponding to said known radius of said radius calibration pin.

19. The apparatus of claim 18, wherein said computer performs said radius calibration by correlating a number of camera pixels between said two horizontally extending and vertically spaced light lines to said known radius of said radius calibration pin.

20. The apparatus of claim 12, wherein during a doctor blade straightness measurement, said camera receives a shadow of said third light beam based on a horizontal edge of said doctor blade mounted in said doctor blade holding device, said camera generating a straightness signal containing straightness data corresponding to a straightness of said doctor blade as said doctor blade is moved by said doctor blade holding device along said Z-axis, said camera supplying said straightness signal to said computer for further processing to determine if said straightness of said doctor blade is within an acceptable tolerance.

21. The apparatus of claim 12, wherein during a doctor blade radius measurement, said camera receives a reflection of said first light beam and said second light beam off of a curved radial surface of said doctor blade mounted in said doctor blade holding device, said curved radial surface having a radius, said camera generating a radius signal containing radius data based on a sampling of said radius at various points along a longitudinal length of said doctor blade and supplying said radius signal to said computer for further processing to determine if said radius of said doctor blade is within an acceptable tolerance.

22. The apparatus of claim 21, wherein said computer determines an X straightness of said doctor blade based on said radius data.

23. An apparatus for measuring geometric deviations in a doctor blade, comprising:

a camera defining an optical axis, said optical axis defining an X-axis in a Cartesian coordinate system, wherein a Y-axis is oriented vertically and a Z-axis is oriented orthogonal to both said X-axis and said Y-axis, and wherein an origin of said Cartesian coordinate system defines an intersection point, with said camera being separated by a distance from said intersection point along said X-axis;

a first light source having a first central axis, said first light source being separated by a distance from said intersection point along said first central axis, said first central axis being angularly disposed from said X-axis by a first angle that is positive with respect to said X-axis;

a second light source having a second central axis, said second light source being separated by a distance from said intersection point along said second central axis, said second central axis being angularly disposed from said X-axis by a second angle, wherein said second angle is negative with respect to said X-axis;

a third light source having a third central axis, said third light source being separated by a distance from said intersection point along said third central axis, said third central axis being coincident with said X-axis; and a doctor blade holding device to mount a doctor blade such that a longitudinal extent of said doctor blade is parallel to said Z-axis, and wherein a portion of said doctor blade is positioned at said intersection point during a measurement of said doctor blade.

24. The apparatus of claim 23, comprising a mounting fixture for mounting said camera, said first light source, second light source, said third light source and said doctor blade holding device.

25. The apparatus of claim 24, wherein said mounting fixture includes a first angular mount for mounting said first light source and a second angular mount for mounting said second light source, said first angular mount providing adjustable angular positioning of said first light source relative to said X-axis, and said second angular mount providing adjustable angular positioning of said second light source relative to said X-axis.

26. The apparatus of claim 24, wherein said mounting fixture includes a slide mount for mounting said camera, said slide mount providing adjustable linear positioning of said camera along said X-axis to adjust a focus of said camera relative to said intersection point.

27. The apparatus of claim 24, wherein said mounting fixture is configured to move said doctor blade along said Z-axis.

* * * * *